3,328,365
ACRYLONITRILE, VINYL CHLORIDE 1,2-DICHLO-
ROETHYLENE TERPOLYMER AND PROCESS OF
PREPARING SAME
Norman E. Aubrey, West Springfield, Mass., and Lionel
M. Normandin, Glen Falls, N.Y., assignors to Monsanto Company, a corporation of Delaware
No Drawing. Filed Mar. 11, 1964, Ser. No. 351,887
6 Claims. (Cl. 260—80.5)

The present invention relates generally to a new and useful high molecular weight terpolymer having a high glass transition temperature and excellent thermal stability, and more particularly to a high molecular weight terpolymer of vinyl chloride, acrylonitrile, and 1,2-dichloroethylene.

Rigid and semi-rigid compositions of polyvinyl chloride and its related copolymers and interpolymers are becoming of increasing importance in the preparation of rigid and semi-rigid sheets, tubes, and molded objects having high impact resistance. These compositions are characterized by good flow properties at relatively low processing temperatures in addition to excellent chemical and solvent resistance. These latter properties as well as its high resistance to ultraviolet radiation have made polyvinyl chloride resins particularly attractive for many outdoor applications such as corrugated and flat roofing, siding, etc. The vinyl chloride resins have, however, suffered a major disadvantage in some applications due to their relatively poor heat distortion properties. This disadvantage has been overcome to some extent by post-chlorinating the resin in any of several well known procedures such as photochlorination, post-chlorination under high temperatures and pressures in the presence of swelling agents, etc.

Post-chlorinated polyvinyl chloride resins, although decidedly superior in some respects to the unchlorinated resin, are nevertheless associated with disadvantages such as brittleness, and poor workability. As a result, their use commercially has been severely curtailed, even though the high glass transition temperatures of post-chlorinated polyvinyl chloride have suggested numerous new uses heretofore impractical with conventional polyvinyl chloride resins. No single terpolymer or polymeric blend enjoys a desirable combination of low cost, ease of fabrication in conventional thermoplastic processing equipment, insolubility, resistance to sunlight and prolonged heat, a relatively flat flexural modulus versus temperature curve, resistance to chemical attack and high impact strength over a wide temperature range.

It is, therefore, an object of this invention to provide an improved terpolymer system which, together with suitable additives, provides a superior thermoplastic composition for use in exacting service where to be desirable a material must combine numerous specific properties.

It is a further object of this invention to provide low cost compositions which satisfy complex use requirements in service heretofore requiring the specification of only the more expensive rigid, semi-rigid, or flexible polymeric materials, or those which are particularly difficult to fabricate into useful objects.

It is still a further object of this invention to provide a terpolymer system consisting of chemically combined vinyl chloride, acrylonitrile, and 1,2-dichloroethylene which possesses a high glass transition temperature, good thermal stability, and excellent processing characteristics.

It is a further object of this invention to provide a process for preparing a terpolymer useful in the production of low cost flexible, semi-rigid and rigid products comprising polymerizing vinyl chloride, acrylonitrile, and 1,2-dichloroethylene in the presence of conventional initiators, stabilizers, and the like.

It is a further object of this invention to provide the art with a novel composition useful in the production of compositions for sheets, tubes, pipes, films, and molded objects in general.

Each of the above objects has been realized through the development of a novel high molecular weight terpolymer of vinyl chloride, acrylonitrile, and 1,2-dichloroethylene prepared in a manner to be described below. These terpolymers, as compared to copolymers of vinyl chloride and acrylonitrile, have much higher glass transition temperatures, are more readily molded, and provide better thermal stability and chemical resistance. In comparison to copolymers of vinyl chloride and 1,2-dichloroethylene, the terpolymers have higher molecular weight and possess greater mechanical strength and improved flexibility.

The 1,2-dichloroethylene is present in the terpolymer in amounts of between about 1–15 percent and more preferably between about 5–10 percent. Although it might be desirable under some circumstances to introduce up to 15 percent of 1,2-dichloroethylene in order to increase the glass transition temperature even further, it has been found that 1,2-dichloroethylene, when combined in amounts greater than about 15% of the terpolymer has the undesirable effect of reducing the molecular weight by a chain transfer action. The acrylonitrile, which serves the important function of increasing the molecular weight of the terpolymer, is present in amounts of between 30–70 percent and more preferably between about 40–60 percent, while vinyl chloride makes up the remainder of the terpolymer. Since acrylonitrile enters the growing polymer chain faster than vinyl chloride and 1,2-dichloroethylene, and since 1,2-dichloroethylene enters the chain much more slowly than either acrylonitrile or vinyl chloride, the monomer charge will differ considerably from the desired terpolymer composition. For example, a monomer charge of 40% vinyl chloride, 10% acrylonitrile, and 50% 1,2-dichloroethylene may, upon polymerization, yield a terpolymer comprising 45% by weight vinyl chloride, 50% by weight acrylonitrile and 5% by weight of 1,2-dichloroethylene, all chemically combined. The exact proportions of each constituent present in the terpolymer will determine the ultimate mechanical properties of the polymer. Therefore, the monomer charge needed to produce a terpolymer having a given combination of properties may be determined empirically once the desired properties are established. It has been found that good results are obtainable where the 1,2-dichloroethylene monomer is present in amounts of about 10 to 60 parts by weight, the acrylonitrile monomer is present in amounts of about 1 to 50 parts by weight, and the vinyl chloride monomer is present in amounts of about 10 to 80 parts by weight. Decidedly superior results are obtainable, however, where the 1,2-dichloroethylene monomer is present in amounts of about 30 to 60 parts by weight; the acrylonitrile monomer is present in amounts of about 5 to 20 parts by weight, and the vinyl chloride monomer is present in amounts of 30 to 45 parts by weight. All the monomer may be present at the initiation of polymerization or may be added incrementally as the polymerization progresses. Obviously, factors such as the polymerization temperature, type of initiator, type of polymerization process, etc., will also contribute to the final constituency of the terpolymer.

A range of typical monomer charges is shown below, together with specific viscosity measurements of the resultant terpolymer. As can be readily seen, an increase in 1,2-dichloroethylene in the monomer charge decreases the specific visocity of the terpolymer, while an increase in acrylonitrile content in the monomer charge increases its specific viscosity.

MONOMER CHARGE (PERCENT BY WEIGHT)

| Vinyl Chloride | Acrylonitrile | 1,2-dichloroethylene | Specific [1] Viscosity |
|---|---|---|---|
| 45 | 11 | 45 | 0.341 |
| 40 | 10 | 50 | 0.302 |
| 36 | 9 | 55 | 0.285 |
| 42 | 16 | 42 | 0.415 |
| 38 | 14 | 48 | 0.330 |
| 35 | 13 | 52 | 0.349 |

[1] (0.40 gm. in 100 ml. of cyclohexanone at 25° C.)

The following examples are presented to illustrate the invention in more detail, but are not intended to be limitations thereof. Unless otherwise indicated, all quantities are on a part by weight basis.

Example I

A terpolymer was prepared by charging a clean reaction vessel equipped with heat transfer means to remove the exothermic heat of polymerization, with 40 parts of vinyl chloride monomer, 10 parts of acrylonitrile, and 50 parts of 1,2-dichloroethylene. To this was added 0.5 part of acetyl cyclohexane persulfonate initiator, and the temperature was adjusted to 20° C. After 14 hours the polymerization was terminated by venting off the residual monomer. The resin contained approximately 50 percent by weight of combined acrylonitrile, 45 percent by weight of combined vinyl chloride, and 5 percent by weight of combined 1,2-dichloroethylene.

Example II

Example I was repeated using 35 parts of vinyl chloride, 13 parts of acrylonitrile and 52 parts of 1,2-dichloroethylene. A solid white resin was obtained having a specific viscosity of 0.349.

Example III

A terpolymer was prepared by charging a clean glass lined reaction vessel having an agitator and equipped with heat transfer means to remove the exothermic heat of polymerization, with 160 parts of purified water, .35 part of methyl cellulose, and 0.25 part lauroyl peroxide. To this was added 60 parts of 1,2-dichloroethylene, 5 parts of acrylonitrile, and 35 parts of vinyl chloride, and the temperature was adjusted to 35° C. After 14 hours the polymerization was terminated by venting off the residual monomer and the resin was washed and dried by conventional techniques.

Example IV

Example III was repeated except that a monomer charge of 40 parts of 1,2-dichloroethylene, 30 parts acrylonitrile, and 40 parts vinyl chloride were used as a monomer charge. A solid white resin was obtained.

Reference is made to the following table which indicates the unusual mechanical properties of the terpolymers made in accordance with this invention:

| | Monomer Charge (Weight) | | | | |
|---|---|---|---|---|---|
| Polymer No. | Vinyl Chloride, Percent | Acrylonitrile, Percent | 1,2-dichloroethylene, Percent | Specific Viscosity | Glass Transition Temp. (Tg), (° C.) |
| 1 | 40 | 10 | 50 | 0.302 | 114 |
| 2 | 35 | 13 | 52 | 0.349 | 121 |

Dynamic Mechanical Properties of Polymer No. 1 [1]

| Temp. (° C.) | 101 | 107 | 115 | 119 | 125 | 129 | 140 | 150 | 158 | 169 | 178 | 183 |
|---|---|---|---|---|---|---|---|---|---|---|---|---|
| Shear Modulus ($\frac{dynes}{cm.^2} \times 10^7$) | 381 | 176 | 78.2 | 54.4 | 34.9 | 27.7 | 17.2 | 13.3 | 12.5 | 10.5 | 9.10 | 8.7 |

Dynamic Mechanical Properties of Polymer No. 2

| Temp. (° C.) | 85 | 102 | 180 | 114 | 120 | 126 | 132 | 138 | 146 | 155 | 163 | 173 | 183 |
|---|---|---|---|---|---|---|---|---|---|---|---|---|---|
| Shear Modulus ($\frac{dynes}{cm.^2} \times 10^8$) | 54 | 57 | 27 | 18 | 12 | 9.3 | 6.8 | 6.0 | 4.4 | 3.2 | 2.8 | 2.5 | 2.1 |

[1] Samples of the polymers were prepared by molding the resins at 195° C. and 5,000 p.s.i. for 3 minutes.

As can be readily seen from the above table, the terpolymers made in accordance with this invention possess excellent glass transition temperatures. In addition, both samples also show an exceptionally high shear modulus at elevated temperatures, approximately 12 to 15 times that of conventional polyvinyl chloride at these same temperatures.

The terpolymers of this invention also possess excellent processing characteristics, unusual chemical resistance and exceptionally high impact strength.

The polymerization of the monomers to form the terpolymer described above may be accelerated by heat, irradiation and polymerization catalysts. Catalysts which may be useful in this regard are the monomer soluble organic peroxides, e.g., benzoyl peroxide, lauroyl peroxide, 2,4-dichlorobenzoyl peroxide, acetyl benzoyl peroxide, t-butyl peroxypivalate, acetyl cyclohexyl sulfonyl peroxide, or other unsymmetrical peroxides, t-butyl hydroperoxide, alkyl percarbonates, perborates, azo compounds, and mixtures of the same. The quantity of catalyst will generally be varied depending upon initiator activity, and on the quantity of monomer and diluent. Polymerization aids such as molecular weight modifiers, noninhibiting heat stabilizers, emulsifiers, buffers, catalyst activators such as reducing agents, non-interfering plasticizers, fillers, pigments, cross-linking agents, etc., may also be advantageously employed in this regard.

Polymerization may be carried out in mass, suspension, emulsion, or solution using any of the free radical producing initiators and polymerization aids.

The compositions described in this invention have a relatively broad range of use temperatures and combine exceptional resistance to chemical attack, high glass transition temperatures, excellent mechanical properties, and superior processing properties with resistance to the deleterious effects of prolonged exposure to heat and light. Hardness, rigidity, dimensional stability, toughness, tensile strength, elongation, and tear strength may readily be adjusted over a wide range by varying the proportions of the monomeric constituents and liquid plasticizers, if any. Processing temperatures utilized with these compositions are such that no significant degradation occurs during the overall manufacturing operation.

Polymerization is generally carried out at low temperatures, i.e., between 5° C. and 30° C.; and more preferably between 10° C. to 20° C. since low temperatures are desirable for the production of a high molecular weight polymer. Superior results are obtainable in this low temperature range, however, satisfactory results may be obtained using higher temperatures, such as those conventionally used in free radical polymerizations.

Typical applications for these materials include conduits for high temperature fluids, corrugated and flat roofing, siding, wire and cable insulation, etc.

Processing aids which may advantageously be incorporated include acrylate rubbers, styrene-acrylonitrile-butadiene terpolymers, styrene-methyl styrene acrylonitrile terpolymers, styrene-acrylonitrile copolymers, methyl methylacrylate polymers, solid aromatic residues from petroleum cracking operations, and so forth.

Liquid plasticizers which may be useful in certain of the compositions include cyclic phosphate esters such as tricresyl phosphate, phthalate esters such as di-2-ethyl benzyl and di-tridecyl phthalate, adipate esters such as di-n-octyl and n-octyl-n-decyl adipate, azelate esters such as di-2-ethyl benzyl azelate, sebacate esters such as di-2-ethyl hexyl sebacate, trimellitate esters, epoxidized soybean oil, epoxidized tall oil and epoxy stearate plasticizers, complex linear polyesters and polymeric plasticizers, certain citric, acetylcitric, tartaric and ricinoleic acid esters, certain glycol, glycerol and penta-erythritol esters of fatty acids, and so forth.

Other additives may be used for optimizing the processing performance and/or end use properties of the compositions such as stabilizers, co-stabilizers, antioxidants, lubricants, coated and/or uncoated fillers, pigments and light screeners.

The particular combination of primary ingredients and additives in commercially useful composition within the range of this invention depends on the specific combination of end use requirements and is varied from one application to another to achieve the optimum overall cost-performance ratio.

While in the foregoing specification, specific compositions and steps have been set out in considerable detail for the purpose of illustrating the invention, it will be understood that such details of composition and procedure may be varied widely by those skilled in the art without departing from the spirit of this invention.

What is claimed is:
1. A random addition terpolymer of high molecular weight having a specific viscosity of at least about 0.28 (0.40 gram in 100 milliliters of cyclohexanone at 25° centigrade) comprising by weight: 1 to 15 percent 1,2-dichloroethylene, 30–70 percent acrylonitrile, and the remainder vinyl chloride.
2. A random addition terpolymer according to claim 1 wherein said 1,2-dichloroethylene is present in amounts of between 5 to 10 percent.
3. A random addition terpolymer according to claim 1 wherein said acrylonitrile is present in amounts of between 40–60 percent and said vinyl chloride is present in amounts of between 30–55 percent.
4. A method of preparing a terpolymer of high molecular weight having a specific viscosity of at least about 0.28 (0.40 gram in 100 milliliters of cyclohexanone at 25° centigrade) comprising polymerizing 10 to 60 parts by weight of 1,2-dichloroethylene, 1 to 50 parts by weight of acrylonitrile, and 10 to 80 parts by weight of vinyl chloride in the presence of a catalytic amount of a peroxy type initiator at temperatures ranging from 5 to 30° C. to form a resinous product having a high glass transition temperature.
5. A process according to claim 4 wherein polymerization is carried out at temperatures of between about 10° C. to 20° C.
6. A method according to claim 4, wherein said 1,2-dichloroethylene is present in amounts of between 30 to 60 parts by weight, said acrylonitrile is present in amounts of between 5 to 20 parts by weight, and said vinyl chloride is present in amounts of between 30 to 45 parts by weight.

References Cited
UNITED STATES PATENTS 2,868,756   1/1959   Walter _____ 260—80.5

OTHER REFERENCES

"The Chemistry of Acrylonitrile," 2nd edition, pp. 32 and 33, American Cyanamid Co., N.Y. (1959).

JOSEPH L. SCHOFER, Primary Examiner.

W. HOOVER, J. A. SEIDLECK, Assistant Examiners.